Oct. 13, 1959 W. D. MOEHRING 2,908,859
COMBINED TACHOMETER AND CAM ANGLE INDICATING CIRCUIT
Filed Nov. 24, 1954 2 Sheets-Sheet 1

INVENTOR.
WILLIAM D. MOEHRING
BY
ATTORNEY

United States Patent Office

2,908,859
Patented Oct. 13, 1959

2,908,859

COMBINED TACHOMETER AND CAM ANGLE INDICATING CIRCUIT

William D. Moehring, Kalamazoo, Mich., assignor to Allen Electric & Equipment Company, Kalamazoo, Mich., a corporation of Michigan Application November 24, 1954, Serial No. 470,893

7 Claims. (Cl. 324—16)

This invention refers to testing equipment for testing the electrical circuitry of an automotive engine and refers particularly to a compact device effective alternatively for testing ignition advance of an automotive engine and for testing the cam angle, or dwell time, of the breaker points of the ignition system.

In the development of equipment for testing various electrical functions of an automotive engine, and particularly where such equipment is designed for garage or service station use, it is desirable to consolidate into a single piece of equipment apparatus effective for checking as many characteristics as possible of the automotive engine.

In the previous application of Ralph J. Weidner, Serial No. 412,212 filed February 24, 1954, and entitled "Means for Checking Ignition Timing of an Internal Combustion Engine," now Patent No. 2,817,058 and assigned to the same corporate assignee as the present invention, there was disclosed apparatus for measuring ignition advance of an automotive engine. I have discovered an advantageous additional circuit which can be applied to the circuit of said Weidner application for alternative operation with a portion thereof by which much of the circuit of said application can be utilized together with the additional circuit I have devised for the purpose of determining cam angle, or dwell time, characteristics of the automotive engine. By thus combining circuits effective for this purpose into a more compact unit, it becomes possible both to lower the original cost of equipment capable of performing these two operations and to increase the convenience of service personnel in checking the electrical circuit of the automotive engine. Thus, the expense to the ultimate customer of properly maintaining his automobile engine can be quite materially reduced.

Accordingly, a major object of the invention has been to provide an electrical circuit effective for measuring cam angle, or dwell time, of the breaker points in an automotive electric circuit.

A further object of the invention has been to provide a circuit, as aforesaid, which is capable of utilizing a portion of the equipment disclosed in the above mentioned application.

A further object of the invention has been to provide a circuit, as aforesaid, in which the respective functions of the entire unit can be carried out quickly and efficiently.

A further object of the invention has been to provide a circuit, as aforesaid, which can be readily adapted for either of its respective functions by a simple switching operation.

A further object of the invention has been to provide a circuit, as aforesaid, in which either of its respective functions can be indicated upon the same meter.

A further object of the invention has been to provide a circuit, as aforesaid, which will be relatively simple and compact.

A further object of the invention has been to provide a circuit, as aforesaid, in which the additional circuitry directed toward measuring cam angle is of sufficiently minor character that it will not materially increase the cost of the completed unit over the cost of a unit adapted for measuring ignition advance only.

A further object of the invention has been to provide a device, as aforesaid, in which the indication of cam angle will not be different from the manner of indicating same as now carried out by conventional devices.

Other objects and purposes of the invention will be apparent to persons acquainted with apparatus of this general type upon reading the following specification and inspection of the accompanying drawings.

In general

In general, the circuit for measuring ignition advance utilizes a pair of thyratrons of which one is normally rendered conductive upon the firing of a selected spark plug of the automobile engine being tested and such conduction renders a further thyratron conductive upon the elapsing of a predetermined period of time. When the second thyratron becomes conductive, a capacitor discharges into the trigger circuit of a flash lamp and effects energization thereof. Thus, by properly adjusting the time interval between the firing of the spark plug and the energization of the flash lamp, said flash lamp being utilized to illuminate the timing marks on some rotating part, as the fly-wheel, of the automobile engine, the period by which said spark plug fires ahead of the normal idling speed, or zero position, can be readily determined and can be conveniently indicated on an integrating type meter in series with the first above-mentioned thyratron.

For effecting cam angle measurement, a circuit responsive to the imposing and removal of potential at the breaker points is connected to a first high vacuum triode whose anode circuit is connected to the control electrode of a second high vacuum triode which is in the anode circuit of the second thyratron above-mentioned. The cathode of said second high vacuum triode is then connected directly to the cathode circuit of the first above-mentioned thyratron and the second thyratron and capacitor circuits above-mentioned are by-passed. This results in an application of impulses to the integrating meter of the circuit above-mentioned in response to intermittent potential at the breaker points, which impulses are measurable in the same general manner as the pulses applied thereto when the same is functioning as an ignition advance measuring device and the cam angle can be read directly therefrom. An additional scale may be added to this meter, if desired.

Detailed description

In setting forth a description of typical apparatus with which the invention may be used, it will be assumed that the internal combustion engine in question has its timing markings on its fly-wheel and on the part of the engine block adjacent the fly-wheel. However, it will be recognized that the apparatus of the invention will be equally applicable to those engines wherein the timing markings are on the fan drive pulley or on any other part which rotates positively with the crank shaft of the engine. It will also be assumed that the distributor rotates at one-half crank shaft speed.

Further, since the timing markings on most engines are placed with respect to the number one spark plug, the description of the present invention will be made in terms of an engine so marked, although it will be evident as the description proceeds that similar markings and analysis may be made with respect to any spark plug.

Figure 3:
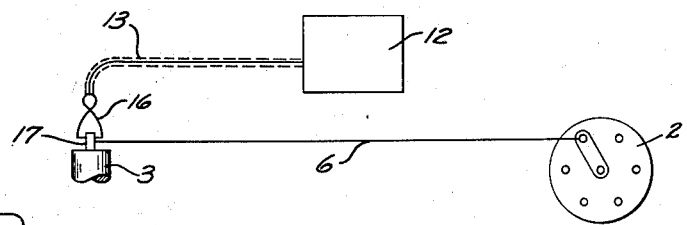
Figure 3 illustrates one method of connecting the apparatus of the invention to the automobile ignition system for measuring ignition advance.

Referring to the drawings, there is shown (Figures 1, 2 and 3) a conventional internal combustion engine 1 which is provided with a distributor 2 and a plurality of conventional spark plugs of which two are indicated at 3 and 4. Conventional cables 7 and 6 lead from the respective terminals of the distributor cap to the several spark plugs. A fly-wheel 8 is associated with the engine in a conventional manner and carries a conventional timing marking 9. The matching marking 11 appears on the engine block at a suitable point adjacent said fly-wheel and indicates the position of the fly-wheel when the number one spark plug should fire at low, as idling, speeds.

The apparatus of the invention is indicated by a control box 12 having a cable 13, preferably shielded, terminating in a clip 16 adapted for engaging the spark plug terminal 17.

A flash lamp 21 (Figures 1 and 4) is provided of the type generally indicated by United States Patent No. 2,399,222 and it is connected by a cable 22 to said control box. A power cable 23 is connected to any suitable source of electrical power, such as 115 volts alternating potential.

Figure 4:
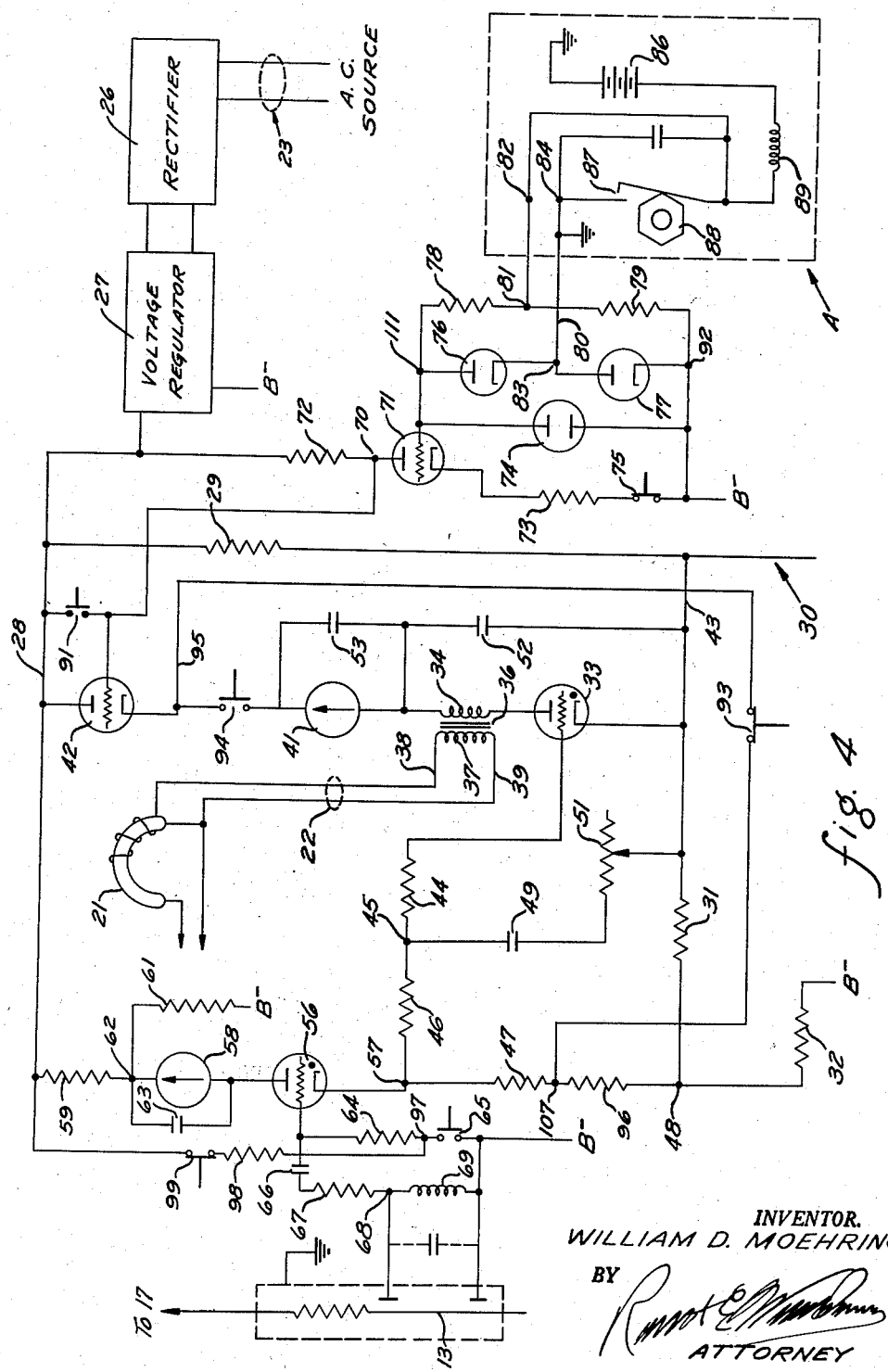
Figure 4 illustrates diagrammatically an ignition advance measuring circuit together with a circuit alternatively cooperating with a portion of the ignition advance measuring circuit for indicating cam angle.

Turning now to a preferred circuit within the box 12 and referring particularly to Figure 4, the power cable 23 is connected to a rectifier 26 and the output of said rectifier is connected to a voltage regulator 27. The characteristics of the rectifier and the voltage regulator are such that there is supplied a substantially constant potential, such as 150 volts D.C., to the positive line conductor 28 of the apparatus. It will be recognized that any other source of substantially constant potential may be provided to energize the line conductor 28 and that the rectifier 26 and the voltage regulator 27, provided here in connection with an A.C. source, may be replaced by any convenient source of substantially steady D.C. potential.

A thyratron 33 has its cathode connected directly to a conductor 43. The anode of said thyratron is connected through the primary winding 34 of a transformer 36 thence through a meter 41 to one side of a rectifier 42. In this case, said rectifier is a high vacuum triode, and the connection is to the cathode thereof. The other side of said rectifier is connected to the positive line conductor 28. The secondary winding 37 of said transformer 36 supplies the conductors 38 and 39 which become the cable 22 for energizing the triggering circuit of the flash lamp 21. The principal electrodes of said lamp are energized from any convenient source, not shown, and in a conventional manner.

The meter 41 is of any common direct current indicating type, preferably of the moving coil type.

A voltage divider 30 includes the relatively high resistance 29, the conductor 43, a relatively low resistance 31 and a resistance of intermediate value 32.

The grid of the thyratron 33 is connected through a resistance 44 of moderate value to protect the grid to a junction point 45 and thence through a resistance 46 of very high value to a junction point 57. The junction point 57 is connected through resistances 47 and 96 to a junction point 48 located between the resistances 31 and 32. The junction point 45 is connected through a capacitor 49 to one side of a variable resistance 51 of which the other side is connected to the conductor 43. A capacitor 52 is connected around the primary winding 34 and the thyratron 33. A further capacitor 53 may be connected around the meter 41 for the purpose of steadying said meter. The polarity of the rectifier 42 is the same as the polarity of the thyratron 33 and hence conduction will be permitted from the line 28 through the meter 41 and thence to charge the capacitor 52 when the thyratron is non-conductive or, when said thyratron is conductive, through the thyratron 33 to the negative terminal of the D.C. source.

A second thyratron 56 is connected by its cathode to the junction point 57 located between the resistances 46 and 47 and is connected by its anode through a further meter 58, of any direct current indicating type, preferably of the moving coil type, and thence through a further resistance 59 to the conductor 28. A resistance 61 is connected from a junction point 62, located between the resistance 59 and the meter 58 to the negative side of the source. A capacitor 63 may be provided around the meter 58 for the purpose of steadying same. The grid of the thyratron 56 is connected through the resistance 64 and through a switch 65 to the negative terminal of the D.C. source, and is also connected through the capacitor 66 and a further resistance 67 to a connection point 68, which connecting point is in turn connected through an inductance 69 to said negative terminal. Said connecting point is also connected to the spark plug terminal 17 through the cable 13 which is shielded and grounded in a conventional manner.

A point 97 between the resistance 64 and the switch 65 is connected through a high resistance 98 and a switch 99 to the line 28.

To further illustrate the invention, the values of some of the resistances involved in the above described circuit will be given. However, it should be clearly understood that such values are given solely to illustrate quantitative relationships and are presented as illustrative only and in no sense as limiting, either with respect to their specific values or with reference to their exact proportion with respect to each other. Thus, in one preferred embodiment of the circuit, resistance 29 is 27 k. The resistance 31 is 2.7 k. and the resistance 32 is 10 k. In the same embodiment, the resistance 59 is 15 k. and the resistance 61 is 33 k. The resistance 64 is 270 k., the resistance 47 is 15 k. and the resistance 98 is one megohm. The resistance 44 may be 470 k. and the resistance 46 may be 560 k. The capacitor 52 is provided of whatever size is required to properly trigger the flash lamp, and may advantageously be 0.3 microfarad. The capacitor 49 is of whatever capacity is required to provide the desired time lag in the firing of the thyratron 33 after the firing of the thyratron 56 and may advantageously be of 0.02 microfarad.

The foregoing described circuit is substantially the circuit described in said Serial No. 412,212 with the exception only of the triode 42 herein which replaces a diode used in the circuit of said application.

Continuing now with the portion of the circuit which is newly disclosed by this application, there is provided a first vacuum triode 71 having its anode connected through a junction point 70 and a resistance 72 to the positive side of the constant potential source, here the same source as supplies thyratrons 33 and 56 and indicated by the conductor 28. The anode of said first vacuum triode is also connected to the control electrode of the second vacuum triode 42. The cathode of said triode 71 is connected through a resistance 73 and a switch 75 to the negative terminal of the D.C. source.

A pair of serially connected rectifiers, as diodes 76 and 77, are connected so that the anode of the rectifier 76 is connected to the control electrode of the triode 71, the cathode of said rectifier 76 is connected to the anode of the rectifier 77 and the cathode of the rectifier 77 is connected to the negative side of the source. A pair of resistances 78 and 79 are connected in series and one end of said series group is connected to the control electrode of the triode 71 and the other end of said series group is connected to the negative side of the source. A point 81 intermediate said resistances 78 and 79 is connected to one ignition point 82 and a point 83 intermediate the rectifiers 76 and 77 is connected to the other ignition point 84. Said ignition points are supplied in a conventional manner through the circuit generally indicated at A which constitutes the automotive ignition circuit including a battery 86, induction coil 89, a breaker switch or ignition points 87 and a rotatable cam 88. As is well known, rotation of the cam 88 effects repeated opening and closing of the switch 87 and it thereby determines the period of time during which a given impulse of potential will be applied to the ignition points.

The circuit including the tubes 71, 76 and 77 is in part the same as shown in the application of Ralph J. Weidner, Serial No. 408,720, entitled "Cam Angle Indicating Circuit," filed February 8, 1954, and assigned to the same corporate assignee as the present application, now Patent No. 2,807,778.

The switch 65 controls the connection of the point 97 with the negative side of the constant voltage source, and the switch 99 controls the connection of said point 97 with the positive side of the constant voltage source. The switch 91 connects, when it is closed, the control electrode of the triode 42 with the anode thereof. A conductor 95 connects the cathode of the triode 42 through a switch 93 to the connection point 107. A switch 94 when it is open breaks the connection between the cathode of the triode 42 and both the capacitor 53 and the meter 41.

In the position shown in the drawings, the switches 65, 91, 93, 94 and 99 are in such position that the apparatus will act for measuring the cam angle. Upon moving each of said five switches into their respectively opposite positions, the apparatus will function to measure ignition advance in the manner described in the above mentioned application Serial No. 412,212.

*Operation*

Referring first to the operation of the device for measuring ignition advance, this will be the same as described in connection with Serial No. 412,212 but will be set forth hereinafter in the interest of convenient reference, it being understood that the said switches 65, 91, 93, 94 and 99 are each in their respective positions opposite to that shown in the drawing.

As the description proceeds it will be evident that the functioning is controlled by varying the potentials existing at various points throughout the system. Accordingly, for the purpose of illustration, certain specific potentials taken from a preferred embodiment will be utilized to improve the clarity of the illustration, but it should be borne in mind throughout that these specific values, as the values of certain resistances above mentioned, are for illustrative purposes only and are in no sense limiting.

Thus, with the apparatus in an "at rest" condition and with 150 volts D.C. applied between the terminals of the D.C. source, the resistances above mentioned for illustrative purposes will provide a potential at the point 107 of 50 volts, a potential at the point 48 of 40 volts and a potential at the point 62 of 110 volts. In this condition, since the grid of the first thyratron 33 is connected to the point 48, it is materially more negative than the cathode of said thyratron and hence said thyratron is blocked. Likewise, since the grid of the thyratron 56 is connected to the negative side of the constant potential source, it is materially more negative than the cathode thereof which is connected to the point 48 and hence this thyratron is also blocked. Both thyratrons have their anodes connected to the positive line conductor 28 and hence have sufficient plate potentials to become conductive as soon as their respective grid voltages permit. The capacitor 49 will assume a charge corresponding to the voltage at point 45 as compared to the voltage on conductor 43.

Also, while the apparatus is in "at rest" condition, the capacitor 52 becomes charged from line 28. The charging circuit for the capacitor 52 may be traced from the source through the line 28, the rectifier 42, the meter 41, to the capacitor 52, thence to the conductor 43 and through the resistances 31 and 32 to the negative terminal of the D.C. source.

With the energizing of spark plug 3, to which the cable 13 is connected, a triggering impulse will be received into the system at the junction point 68, setting up oscillations, in the general manner described in application Serial No. 341,166, now abandoned, through the inductance 69 and the cable capacitance. These oscillations will have a positive component which will travel through the capacitor 66 to the grid of the thyratron 56 and render it conductive.

As soon as the thyratron 56 becomes conductive, the voltage at the point 48, continuing the example above set forth, increases to 50 volts, at the point 107 it increases to 60 volts and at the point 62 it decreases to 85 volts. The negative charge on the capacitor 49, however, holds the thyratron 33 non-conductive. The movement of the potential of point 57 in a positive direction is sufficient to reverse the voltage applied across the capacitor 49 and eventually to reverse its charge and raise the potential of the grid of thyratron 33 sufficiently to render said thyratron conductive.

The setting of the variable resistor 51 determines the rate at which the charge on the capacitor 49 is reversed and hence the time required to raise the potential of the said grid to the value necessary to render the thyratron 33 conductive. When the potential on said grid has moved in a positive direction to a predetermined value, the thyratron 33 will become conductive and since a plate voltage is available, said thyratron will conduct. Thus, the time between the firing of the thyratron 56 and the firing of the thyratron 33 is precisely controllable by the setting of a single element, namely, by the setting of the variable resistor 51.

The conduction of thyratron 33 serves to ionize the gas within said thyratron and thereby to permit a discharge of the capacitor 52. This discharge takes place immediately through said thyratron and thereby energizes the transformer 36 and the triggering circuit 22 of the lamp 21. The energy from the capacitor 52 is in sufficient amount to energize said triggering circuit in the usual manner and flash the lamp.

Simultaneously, the discharge of said capacitor has the effect of impressing a reverse potential on the principal electrodes of the thyratron 33 and immediately extinguishing same. Hence, said thyratron will be extinguished simultaneously with the completion of such discharge. Further, continuing the example above utilized, while said thyratron 33 was conductive the potential in the line 43, due to the virtual shorting between said conductor 43 and the positive line 28, rises to approximately 140 volts. The potential at the point 48 rises to approximately 112 volts and the potential at the point 62 rises to 110 volts. Thus, the potential on the cathode of the thyratron 56 is substantially more positive than that on its anode and the thyratron 56 is accordingly forthwith extinguished. Thus, with both thyratrons extinguished the system reverts to its "at rest" condition and will remain in such condition until the reception of another initiating signal from the cable 13. The capacitor 49 will discharge through the circuit including the resistances 46, 47 and 31.

The meter 41 receives pulses of current from two sources. During the brief period that the thyratron 33 is conductive, a current passes from the line conductor 28 through the meter 41, through said thyratron and thence to the negative side of the D.C. source. Also, after the capacitor 52 has discharged, and after the thyratron 33 has ceased to conduct, the recharging of the capacitor 52 will effect a flow of current through the meter 41. The period of current flow resulting from the conduction of the thyratron 33 is usually different, in this embodiment it is much less, in a given cycle of operation than the period of current flow resulting from charging of the capacitor 52. However, each of said periods in any given cycle are equal to corresponding periods in all other cycles and the total current flowing through said meter 41 is proportional to the frequency of energization of the initiating cable 13 and this in turn is proportional to the engine speed. Thus, the deflection of the meter 41 will be proportional to engine speed and it may be accurately calibrated as a tachometer.

Inasmuch as conduction through the thyratron 56 continues from the time at which an impulse is received from the initiating cable 13 until the said thyratron is extinguished as a result of the conduction of the thyratron 33, the ratio between its conducting time and the time of a single period between successive energizations of the cable 13, which is also equivalent to one complete rotation of the distributor, may be adjusted to be equal to the ratio between the distributor degrees of ignition advance and a complete rotation of said distributor. Accordingly, the meter 58 may be calibrated in degrees of advance of the distributor, or of the crank shaft if preferred, and such calibration will remain accurate for all speeds of the engine.

The rectifier 42 functions to prevent the discharging of the capacitor 52 prior to the firing of the thyratron 33. Absence of this rectifier would permit a change in the charge on condenser 52 which would in turn cause the charge on this condenser to be dependent upon the amount of delay used in the advance circuit, thus changing tachometer reading with advance control settings.

Figure 1:
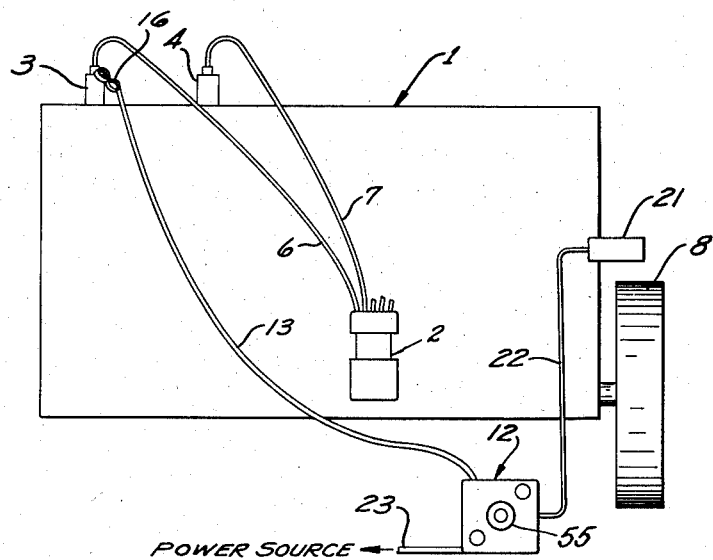
Figure 1 illustrates schematically a typical internal combustion engine including a fly-wheel and distributor associated therewith and showing the apparatus of the invention attached thereto.
Figure 2:
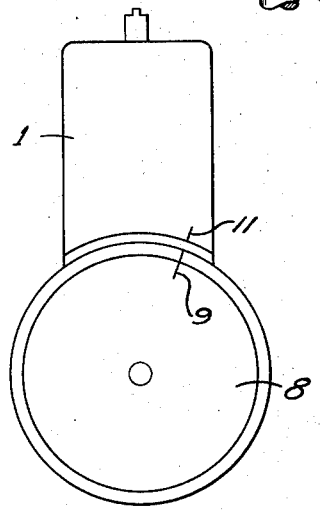
Figure 2 illustrates an end view of said engine showing the timing markings on the fly-wheel and engine housing.

Thus, with the apparatus connected as shown in Figure 1, and above described, and with the engine operating in the usual manner, the period of delay between the impulses in the spark plug cable 6, and simultaneously in the triggering cable 13, and the time of flashing of the lamp 21 may be varied by adjustment of the variable resistor 51 by the dial 55 (Figure 1). Such adjustment is made so that the timing marks 9 and 11 are caused to match in the usual manner regardless of the speed of the engine. When this is done, and bearing in mind that the normal point of matching of said timing markings assumes no ignition advance at all, it will be apparent that the delay between the time at which an impulse appears in the cable 13 and the time of flashing of the lamp will be equal to the time by which the ignition of the spark plug 3, for a given speed, precedes its point of ignition at idling speed. Thus, by calibrating the meter 58 to read directly in degrees of either distributor or crank shaft rotation, it will be possible to read directly thereon the degrees of ignition advance for any given speed of the engine.

When the apparatus is to be used for checking the cam angle, or dwell time, of the breaker points, the switches 91, 93, 94, 99, 65 and 75, which may be simultaneously operated by a single control means, not shown, are all moved into the position shown in Figure 4. Thus, the control electrode of the triode 42 assumes control thereof, said control electrode being now disconnected from the anode of said triode. Since said control electrode is now connected to the anode of the triode 71, the circuit of said triode 71 will now control the conduction of triode 42. Further, the cathode of the triode 42 is disconnected from the anode circuit of the thyratron 33 and is connected through the switch 93 to the junction point 48.

In its "at rest" condition, there is no potential between the points 81 and 83 and accordingly there is no potential applied between the control electrode and the cathode of the first triode 71. Thus, the triode 71 is conductive and the point 70 in its anode circuit is at a potential determined by the value of the resistances 73 and 72. This is chosen at such a point that, in view of the magnitude of the resistance 32, that the triode 42 is normally non-conductive. For example, if the resistance 73 is 500 ohms and the resistance 72 is 14,700 ohms, then the potential of the point 70 is materially more negative than the potential of the point 48 and the triode 42 will not conduct. At the same time, the line 28 is connected through the resistances 98 and 64 to the control electrode of the thyratron 56. This holds the thyratron 56 in normally conductive condition.

The combined resistances 64 and 98 are selected at such values that the grid current is high enough under all quiescent conditions of the tube 56 that said tube is maintained ionized, and said current is low enough to permit the tube 56 to become extinguished upon disappearance of anode potential.

With the automobile engine operating, the cam 88 will open and close the ignition points 87 in a conventional manner and cause an intermittent potential to appear at the ignition terminals 82 and 84. These terminals being connected in any convenient manner, conventional to known cam angle testers, to the points 81 and 83, potential at said points 81 and 83 will follow the potential appearing across the ignition terminals.

When the contacts of the ignition points 87 are closed, and no potential appears between the points 81 and 83, the system is then in the same condition as above described for its "at rest" condition and current is flowing through the thyratron 56. This results in a flow through the meter 58 and the meter is energized.

When the contacts 87 are open, then a potential difference is created between the ignition points 82 and 84 and a potential difference is accordingly created between the points 81 and 83.

It will be recognized that the voltages across the ignition points 82 and 84 are of oscillatory character. Thus, in the manner set forth in detail in said application Serial No. 408,720, a pulse commencing at the point 82 can travel to the point 81, thence through resistance 78, through the rectifier 76, the point 83 and back by the conductor 80 to the point 84. A pulse in the reverse direction travels from point 84 to point 83, then through the rectifier 77 and resistance 79 to point 82. This creates a negative potential at the point 111 with respect to the point 92 regardless of which way the pulses travel between the points 81 and 83. Thus, whenever the breaker contacts are open, the triode 71 will be blocked. This removes the blocking potential from the tube 42, and the tube 42 is thereby rendered conductive. This raises the potential of the point 107 substantially to that of the line 28 and thereby extinguishes tube 56. Thus, the meter 58 is energized whenever, and for the length of time that, the contacts of the switch 87 are closed, and when the ignition point 87 is open, the meter 58 is de-energized.

Said meter 58, will accordingly integrate the proportion of a total cycle of operation during which it is energized with respect to the proportion of such cycle during which it is not energized and will provide an appropriate reading showing the proportion of a total cycle during which the contacts of the switch 87 are closed, which is the cam angle, or dwell time, information desired.

The neon tube 74 is connected in parallel with the grid and cathode of the triode 71 to reduce the voltage caused to appear across said tube parts.

Accordingly, a circuit has been provided effecting the objects and purposes above set forth and a simple and compact unit is provided capable of reading both ignition advance and cam angle on the same meter and thereby utilizing in part the same equipment upon the actuation of a single switch control and embodying a device which is both rugged and providing a high degree of accuracy.

While certain specific apparatus has been utilized herein to illustrate the invention, it will be recognized that

I claim:

1. Apparatus for alternatively checking ignition advance and cam angle in the ignition system of an internal combustion engine, comprising in combination: a source of constant potential having positive and negative terminals; a flash lamp having a starting circuit; a power capacitor connected to said positive terminal for normally charging therefrom; a first thyratron; a transformer the secondary winding of which is connected to the starting circuit of said flash lamp; means connecting said first thyratron and the primary winding of said transformer to form a discharge path for said capacitor; a vacuum tube having a control electrode, said tube being connected in series with said capacitor and in the same polarity as said first thyratron, said vacuum tube being located in a circuit common both to the charging circuit of said capacitor and to the circuit through said first thyratron, but out of the discharge circuit of said capacitor; an integrating meter; a second thyratron and a circuit including said second thyratron and said integrating meter in series with each other; first circuitry maintaining said first thyratron normally non-conductive and other circuitry effective upon conduction of said second thyratron followed by the elapsing of a predetermined period of time for affecting said first circuitry for rendering said first thyratron conductive; a pair of terminals connectible to the ignition breaker points; cam angle circuitry responsive to the potential difference existing between said terminals for controlling the conductivity of said vacuum tube; means including switches in one position simultaneously (1) disconnecting the anode of said vacuum tube from the control electrode thereof, (2) connecting the cathode of said vacuum tube directly to the cathode circuit of said second thyratron and (3) rendering inactive the circuit including said first thyratron, said capacitor and said transformer, and in another position (1) connecting the control electrode of said vacuum tube to its anode, (2) disconnecting the cathode of said vacuum tube from the cathode circuit of said second thyratron and (3) connecting the cathode of said vacuum tube to the anode end of the circuit including said first thyratron, said capacitor and said transformer and connecting the cathode end thereof to the cathode circuit of said second thyratron.

2. An apparatus for alternatively checking ignition advance and cam angle in the ignition system of an internal combustion engine, comprising in combination: a source of constant potential having a positive and negative side; a flash lamp having a starting circuit; a power capacitor; a first thyratron; a transformer, the secondary winding of said transformer being connected to the starting circuit of said flash lamp; a first voltage divider network having a relatively large first resistance between said source and a first point thereon, a relatively small second resistance between said first point and a second point thereon and an intermediate resistance between said second point and the negative side of said source; means connecting the first thyratron and the primary winding of said transformer in series in a discharge circuit, the end of said discharge circuit connected to the cathode of the thyratron being connected to the first point and the end of said discharge circuit connected to the anode of the thyratron being connected to the positive side of said source; means connecting said power capacitor in parallel with said discharge circuit; a circuit including a vacuum tube having a control electrode and a current responsive meter connecting the discharge circuit to the positive side of said source, said vacuum tube being connected in the same polarity as said first thyratron; a second voltage divider network having a relatively small resistance between the positive side of said source of constant potential and a connecting point thereon and a relatively high resistance between said connecting point and the negative side of said source; an integrating meter; a circuit including a second thyratron and said integrating meter in series with each other between said connecting point and said second point, the anode circuit of said second thyratron being connected to said connecting point and the cathode circuit thereof being connected to said second point; the grid of said first thyratron being connected to said second point; said grid being also connected through a timing capacitor to a point of fixed potential; a pair of terminals connectible to the ignition breaker points; cam angle circuitry responsive to the potential difference existing between said terminals for controlling the conductivity of said vacuum tube; means including switches in one position simultaneously (1) disconnecting the anode of said vacuum tube from the control electrode thereof, (2) connecting the cathode of said vacuum tube directly to said second point and (3) rendering inactive the circuit including said first thyratron, said power capacitor and said transformer, and in another position (1) connecting the control electrode of said vacuum tube to its anode, (2) disconnecting the cathode of said vacuum tube from said second point and (3) connecting the cathode of said vacuum tube to the circuit including said first thyratron, said power capacitor and said transformer.

3. The apparatus of claim 2 wherein the cam angle circuitry comprises: a pair of terminals; first and second resistances each connected at their respective one ends to one of said terminals; first and second rectifiers, the positive side of the first rectifier and the negative side of the second rectifier being connected to the other terminal; a connection including a first junction point connecting the negative side of said first rectifier with the other end of said first resistance; a connection including a second junction point connecting the positive side of the second rectifier with the other end of the second resistance; a second vacuum tube, its control electrode being connected with said second junction point, its cathode connected both to the negative side of said source and to said first junction point, and its anode connected to the control electrode of said previously mentioned vacuum tube.

4. Apparatus for alternatively checking ignition advance and cam angle in the ignition system of an internal combustion engine, comprising in combination: a terminal connectible to a source of constant potential; a flash lamp and flash lamp energizing means; a power capacitor connected to said terminal for normally charging therefrom; a first thyratron; means connecting said first thyratron and the flash lamp energizing means to form a discharge path for said capacitor; a vacuum tube including a control electrode, said tube being connected in series with said capacitor and in the same polarity as said first thyratron, said vacuum tube being located in a circuit common both to the charging circuit of said capacitor and to the circuit from said source through said first thyratron, but out of the discharge circuit of said capacitor; an integrating meter; a second thyratron and a circuit including said second thyratron and said integrating meter in series with each other; first circuitry maintaining said first thyratron normally non-conductive and other circuitry effective upon conduction of said second thyratron followed by the elapsing of a predetermined period of time for affecting said first circuitry for rendering said first thyratron conductive; a pair of terminals connectible to the ignition breaker points; cam angle circuitry responsive to the potential difference existing between said terminals for controlling the conductivity of said vacuum tube; means including switches in one position simultaneously (1) disconnecting the anode of said vacuum tube from the control electrode of said vacuum tube, (2) connecting the cathode of said vacuum tube directly to the cathode of said second thyratron, and (3) rendering inactive the circuit including said first thyratron, said capacitor and said flash lamp energizing means, and in another position (1) connecting the control electrode of said vacuum tube to its anode, (2) disconnecting the cathode of said vacuum tube from the cathode circuit of said second thyratron, and (3) connecting the cathode of said vacuum tube to the anode end of the circuit including said first thyratron, said capacitor and said flash lamp energizing means and connecting the cathode end thereof to the cathode circuit of said second thyratron.

5. A cam angle measuring circuit for use with an internal combustion engine having ignition breaker points, the combination comprising: a source of constant potential having a positive side and a negative side; a vacuum tube having a control electrode and having its anode connected to the positive side of said source; a thyratron having its anode connected to the positive side of said source and its cathode connected to the negative side of said source; a resistance interposed in the cathode circuit of said thyratron and a connection from the cathode of said vacuum tube to a point between said resistance and the cathode of said thyratron; means connecting the control electrode of said thyratron to a source of potential positive with respect to the cathode thereof; a meter connected between the positive side of said constant potential source and the anode of said thyratron a pair of terminals connected to the ignition breaker points; and cam angle circuitry connected to said terminals and responsive to the potential difference existing between said terminals; and means connecting said cam angle circuitry to said control electrode for controlling the conductivity of said vacuum tube.

6. Apparatus defined in claim 5 wherein said cam angle circuitry includes a further vacuum tube having a control electrode and means connecting the anode thereof to a source of constant potential, means connecting its cathode to the negative side of said source and means connecting its anode to the control electrode of said previously mentioned vacuum tube, circuitry responsive to the existence of a potential between said terminals for imposing a potential between the control electrode and the cathode for said further vacuum tube.

7. A cam angle measuring circuit for use with an internal combustion engine having ignition breaker points, the combination comprising: a source of constant potential having a positive side and a negative side; a vacuum tube having an anode connected to the positive side of said source and having a control electrode; a pair of terminals connected to the ignition breaker points; cam angle circuitry connected to said terminals and responsive to the potential difference existing between said terminals; means connecting said cam angle circuitry to said control electrode for controlling the conductivity of said vacuum tube; a thyratron having an anode, a cathode and a control electrode, the anode of said thyratron being connected to the positive side of said source and the cathode of said thyratron being connected to the negative side of said source; a resistance interposed in the cathode circuit of said thyratron; means connecting the cathode of said vacuum tube to a point between the cathode of said thyratron and said resistance for controlling the conductivity of said thyratron in response to the conductivity of said vacuum tube; means connecting the control electrode of said thyratron to a source of potential positive with respect to the cathode thereof; and a meter connected between the positive side of said constant potential source and the anode of said thyratron.

References Cited in the file of this patent

UNITED STATES PATENTS

| | | |
|---|---|---|
| 2,450,164 | Ramsay | Sept. 28, 1948 |
| 2,487,070 | Ramsay | Nov. 8, 1949 |
| 2,604,515 | McNulty | July 22, 1952 |
| 2,700,301 | Thomsen | Jan. 25, 1955 |